United States Patent
Arai et al.

(10) Patent No.: US 7,477,979 B2
(45) Date of Patent: *Jan. 13, 2009

(54) FOLLOW RUNNING CONTROL SYSTEM

(75) Inventors: Toshiaki Arai, Utsunomiya (JP);
Tadayoshi Okada, Shioya-gun (JP);
Hisaya Izawa, Utsunomiya (JP);
Makoto Matsumoto, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 613 days.

This patent is subject to a terminal disclaimer.

(21) Appl. No.: 11/066,882

(22) Filed: Feb. 25, 2005

(65) Prior Publication Data
US 2005/0216168 A1 Sep. 29, 2005

(30) Foreign Application Priority Data
Mar. 5, 2004 (JP) ............................. 2004-062386

(51) Int. Cl.
*B60T 7/12* (2006.01)
(52) U.S. Cl. .......................... 701/96; 701/93; 701/300; 340/903; 342/70
(58) Field of Classification Search ................... 701/96, 701/300, 93; 340/903; 342/70
See application file for complete search history.

(56) References Cited

U.S. PATENT DOCUMENTS

| | | | | | |
|---|---|---|---|---|---|
| 5,153,559 | A | * | 10/1992 | Atsumi | 340/435 |
| 5,969,969 | A | * | 10/1999 | Ejiri et al. | 701/41 |
| 6,876,915 | B2 | * | 4/2005 | Kuramochi et al. | 701/96 |
| 7,212,906 | B2 | * | 5/2007 | Arai et al. | 701/96 |

FOREIGN PATENT DOCUMENTS

| | | |
|---|---|---|
| JP | 10-147160 | 6/1998 |
| JP | 2001-277968 | 10/2001 |
| JP | 2002-264688 | 9/2002 |
| JP | 2002-329298 | 11/2002 |
| JP | 2003-260957 | 9/2003 |
| JP | 2004-026097 | 1/2004 |

* cited by examiner

Primary Examiner—Khoi H. Tran
Assistant Examiner—Marie A Weiskopf
(74) Attorney, Agent, or Firm—O'Melveny & Myers LLP

(57) ABSTRACT

A follow running control system of the present invention includes a running control device for performing running control of the present vehicle based on data of the preceding vehicle and a signal from the driving operation detecting device. If advancing of the preceding vehicle is detected by a preceding vehicle advancing detecting device while the advancing request information is stored by a advancing request storing device, the running control device changes a control state of the present vehicle with respect to a follow running control device and starts follow running control.

6 Claims, 7 Drawing Sheets

FOLLOW RUNNING CONTROL SYSTEM

BACKGROUND OF THE INVENTION

Priority is claimed on Japanese Patent Application No. 2004-062386, filed Mar. 5, 2004, the contents of which are incorporated herein by reference.

1. Field of the Invention

The present invention relates to a follow running control system for performing follow running control in which a preceding vehicle is determined to be a target vehicle to be followed by the present vehicle.

2. Description of Related Art

In a known follow running control system, in order to reduce the labor in driver operation, a inter-vehicle distance sensor for determining the distance between the present vehicle and the vehicle in front (i.e., the preceding vehicle) is provided for controlling the running state of the present vehicle so as to ensure a specific distance between vehicles, thereby performing advancing, stopping, and running operations while following the preceding vehicle (see, for example, Japanese Unexamined Patent Application, First Publication No. H10-147160).

Such a follow running control system may have a communication device for communicating the advance of the preceding vehicle while the present vehicle waits for a signal at the intersection or stops on a congested road, and for urging advancing of the present vehicle. In this case, even when the road is crowded with a number of vehicles, a burden on the driver for paying attention to the forward direction is reduced, and the driver is relieved of complicated operations such as repeatedly advancing and stopping again and again.

In conventional systems, driving operation by the driver of the present vehicle for advancing the vehicle is not effective until detecting the advance of the preceding vehicle. Therefore, a difference in driving sensation is produced between running by the driver's manual operation and follow running by the follow running control system, so that the driver may experience discomfort.

More specifically, in detection of the advance of the preceding vehicle, the distance to the preceding vehicle or a change in relative speed with respect to the preceding vehicle is determined by referring to signals of a radar or the like for detecting the preceding vehicle; thus, advancing of the preceding vehicle cannot be detected until the preceding vehicle has actually advanced. However, the driver can recognize situations in which the signal in front is changed from red to green and thus vehicles can advance or that another vehicle in front of the preceding vehicle has been advanced. Therefore, the driver can judge that the preceding vehicle is just about to start moving and can start to release the brake pedal. Accordingly, a difference in driving sensation is produced between running by the driver's natural operation and follow running by the follow running control system.

SUMMARY OF THE INVENTION

In consideration of the above circumstances, an object of the present invention is to provide a follow running control system for smoothly controlling follow running in consideration of the driver's operation performed according to changes in traffic situations around the present vehicle.

In order to achieve the above object, the present invention provides a follow running control system including: an object detecting device, provided in a present vehicle, for detecting objects in an advance direction of the present vehicle; a preceding vehicle determining device for determining a preceding vehicle to be followed by the present vehicle from among the detected objects; a target inter-vehicle distance determining device for determining a target inter-vehicle distance between the present vehicle and the preceding vehicle; a target speed determining device for determining a target speed of the present vehicle based on a signal from the object detecting device and the target inter-vehicle distance; a follow running control device for controlling follow running of the present vehicle with respect to the preceding vehicle based on the determined target speed; a driving operation detecting device for detecting a driving operation performed by a driver of the present vehicle; a stopping state determining device for determining whether or not both of the present vehicle and the preceding vehicle are maintained in the stopped state; a advancing request storing device for storing a control operation input by the driver for requesting the advance of the present vehicle as a advancing request information, when both of the present vehicle and the preceding vehicle are maintained in the stopped state; a preceding vehicle advancing detecting device for detecting advancing of the preceding vehicle based on a signal from the object detecting device; and a running control device for performing running control of the present vehicle based on data of the preceding vehicle and a signal from the driving operation detecting device, wherein if advancing of the preceding vehicle is detected by the preceding vehicle advancing detecting device while the advancing request information is stored by the advancing request storing device, the running control device changes a control state of the present vehicle with respect to the follow running control device and starts follow running control.

According to the follow running control system, when both of the present vehicle and the preceding vehicle are controlled in the stopping control, if driver's driving operation for requesting advancing of the present vehicle is input, the advancing request storing device stores the driver's driving operation as the advancing request information. If the advancing request information has been already stored when the preceding vehicle advances, it can be understood that the driver has an intention to advance the present vehicle. The running control device directly changes the running control state from stop control to follow control, thereby starting follow running control. Therefore, at the same time as the preceding vehicle advances, the present vehicle can be smoothly advanced following the preceding vehicle.

Accordingly, a difference in driving sensation between running of the present vehicle by the driver's natural operation and follow running by the follow running control system is reduced, and it is possible to realize a follow running control system by which the driver does not experience discomfort.

If the advance of the preceding vehicle is not detected by a predetermined time after storing the advancing request information by the advancing request storing device, the running control device may cancel the advancing request information.

In this case, even when the advancing request information has been stored and the driver's intention of advancing the present vehicle is confirmed, if the preceding vehicle is not advancing by a predetermined time after storing the advancing request information, the confirmation of the driver's intention is canceled by canceling the advancing request information, and waits for the next input of the control operation for requesting advancing the present vehicle when both of the present vehicle and the preceding vehicle are controlled in the stopping control. As a result, it can be reconfirmed whether or not the driver has an intention of advancing the present vehicle. Therefore, the present vehicle can be smoothly advanced such that the present vehicle follows the preceding vehicle advancing, only when the driver's intention of advancing the present vehicle is surely confirmed by reconfirming whether or not the driver has an intention of advancing the present vehicle. Accordingly, a benefit can be obtained that the present vehicle can run appropriately following the driver's instruction and traffic situations around the present vehicle.

The running control system may further include a communicating device for communicating advancing of the preceding vehicle to the driver based on a signal from the preceding vehicle advancing detecting device, wherein if advancing of the preceding vehicle is detected while the advancing request information is stored by the advancing request storing device, the communicating device does not communicate advancing of the preceding vehicle to the driver.

In this case, if advancing of the preceding vehicle is detected when the advancing request information has been stored in the advancing request storing device and the driver's intention of advancing the present vehicle is confirmed, the communicating device can cancel communication to the driver for informing the advance of the preceding vehicle. Accordingly, when the driver has already indicated his or her intention to advance the present vehicle by inputting the control operation for requesting the advance of the present vehicle, the present vehicle can smoothly advance and follow up the preceding vehicle at the same time as the preceding vehicle advances, without informing the driver of the advancing of the preceding vehicle which is thought to be already recognized by the driver.

DETAILED DESCRIPTION OF THE INVENTION

Hereinafter, embodiments according to the present invention will be explained with reference to the drawings.

System Structure

Figure 1:
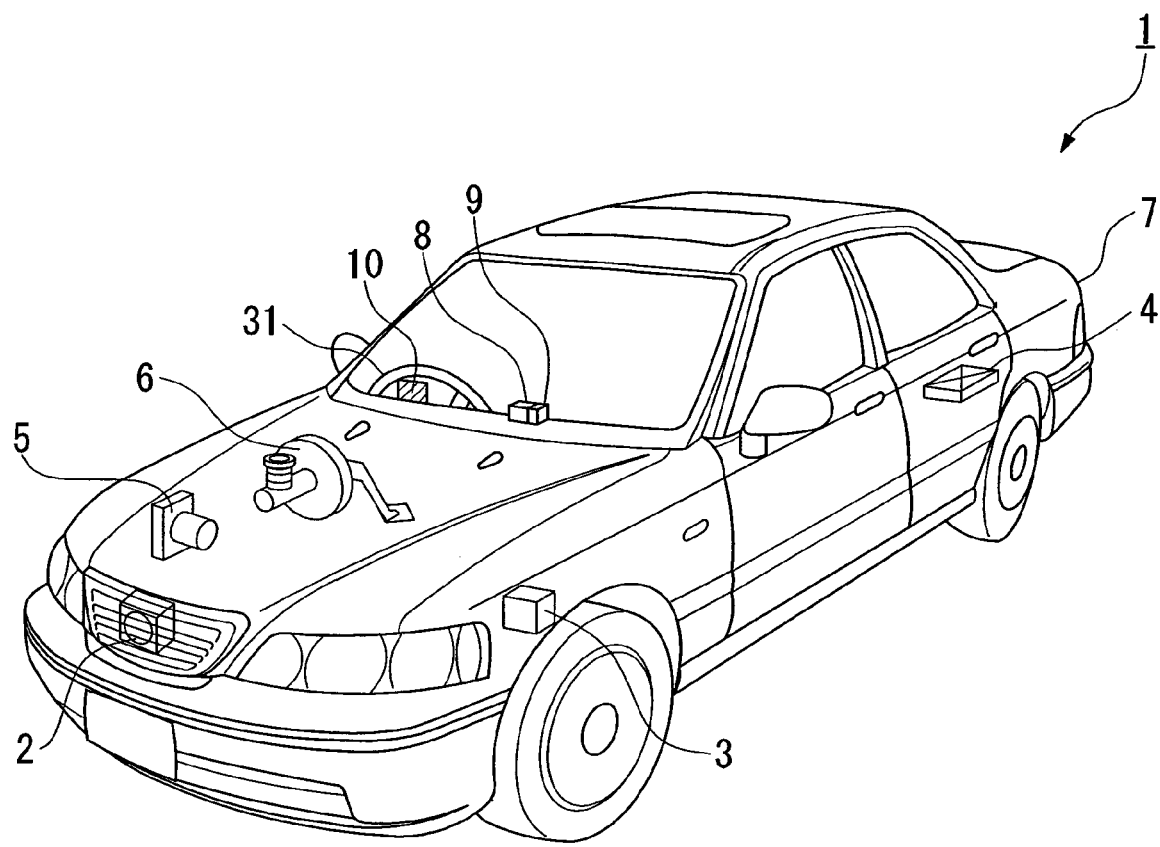
FIG. 1 is a perspective view showing a vehicle in which an embodiment of the follow running control system of the present invention is provided.
Figure 2:
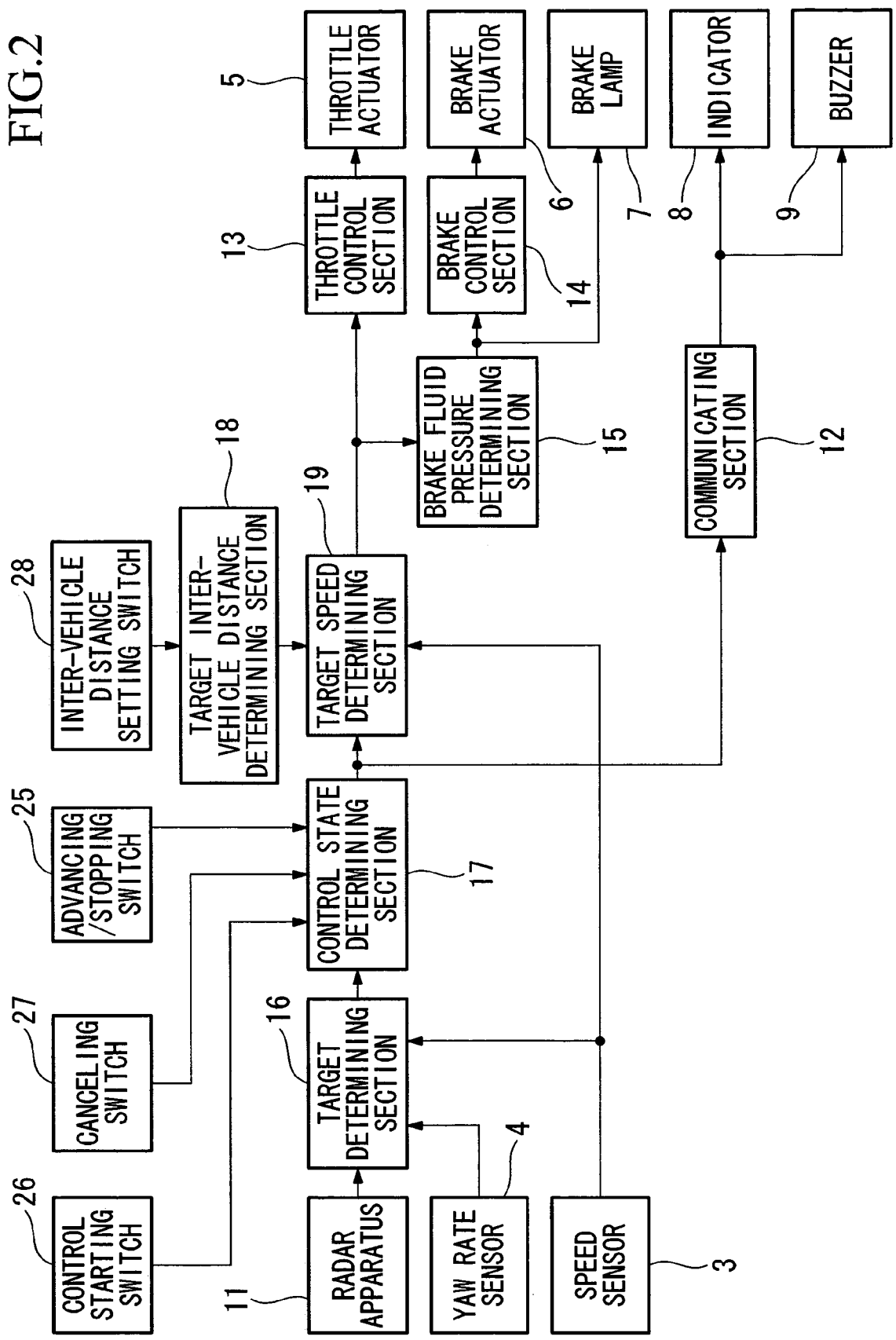
FIG. 2 is a block diagram for showing the structure of the follow running control system in the embodiment.

FIG. 1 is a perspective view showing a vehicle 1 in which an embodiment of the follow running control system of the present invention is provided. FIG. 2 is a block diagram for showing the structure of this follow running control system.

In FIG. 1, the follow running control system of the present embodiment is generally constructed as a millimeter-wave radar integrated ECU (electronic control section) 2. The vehicle 1 has a speed sensor 3 for measuring the running speed of the vehicle 1, and a yaw rate sensor 4 for measuring the yaw rate of the vehicle 1. The measured speed and yaw rate are input into the millimeter-wave radar integrated ECU 2 (i.e., the follow running control system).

The vehicle 1 also includes a throttle actuator 5 for operating a throttle for an engine of the vehicle 1 using oil pressure or electricity, and a brake actuator 6 for operating a brake of the vehicle 1, also using oil pressure or electricity.

At the rear side of the vehicle 1, a brake lamp 7 for indicating the operation state of the brake of the vehicle 1 is provided.

Near the driver's seat of the vehicle 1, an indicator 8 and a buzzer 9 are provided for informing the driver of the control state of the follow running control system. Near a steering wheel 31, switches 10, operated by the driver, are provided for inputting the driving operation for the follow running control system.

The structure of the millimeter-wave radar integrated ECU 2 (i.e., the follow running control system) will be explained in detail by referring to FIG. 2. Reference numeral 11 indicates a radar apparatus for sending a radar wave to the surroundings of the vehicle 1 and receiving waves reflected by an object. This radar apparatus 11 is provided at the front side of the vehicle 1 and detects an object in front of the vehicle 1 by using the received reflected waves.

The follow running control system of the present embodiment has a processing section realized in the ECU section of the millimeter-wave radar integrated ECU 2, which includes a CPU (central processing section). Specifically, the processing section includes a communicating section 12, a throttle control section 13, a brake control section 14, a brake fluid pressure determining section 15, a target determining section 16, a control state determining section 17, a target inter-vehicle distance determining section 18, and a target speed determining section 19.

The communicating section 12 informs the driver of the control state of the follow running control system, by using the indicator 8 or the buzzer 9 provided near the driver's seat.

The throttle control section 13 determines the degree of opening of the throttle and controls the throttle actuator 5 for operating the throttle for the engine of the vehicle 1.

The brake control section 14 controls the brake actuator 6 for operating the brake of the vehicle 1. The control of the brake actuator 6 by the brake control section 14 is performed based on a target fluid pressure (i.e., a target hydraulic pressure) of the brake fluid, which is determined by the brake fluid pressure determining section 15. In addition, the on/off state of the brake lamp 7, provided at the rear side of the vehicle 1, is also controlled according to the target fluid pressure of the brake fluid determined by the brake fluid pressure determining section 15.

The target determining section 16 processes data of an object in front of the vehicle 1, which is detected by the radar apparatus 11. The target determining section 16 has a running locus computing unit for computing the running locus of the vehicle 1 (i.e., the running locus of the present vehicle) by referring to the speed and the yaw rate of the vehicle I measured by the speed sensor 3 and the yaw rate sensor 4. The target determining section 16 also has a preceding vehicle determining unit for (i) detecting a preceding vehicle followed by the present vehicle 1 according to the computed running locus of the present vehicle and the data of objects in front of the vehicle 1 output from the radar apparatus 11, and (ii) for computing object data which include the distance between the detected preceding vehicle and the vehicle 1 and the relative speed between the preceding and present vehicles.

The target determining section 16 also has a stopped state detection unit for detecting that both of the vehicle 1 and the preceding vehicle are in the stopped state based on the computed data of the objects, and a preceding vehicle advancing detecting unit for detecting the advancing of the preceding vehicle by determining whether the preceding vehicle has moved from the stopped state based on the computed data of the objects.

For example, the target determining section 16 recognizes a vehicle on an extension of the running locus of the present vehicle as the preceding vehicle by dividing the speed of the vehicle 1 by the yaw rate of the vehicle 1 so as to compute the corner R (i.e., the radius of curvature at each corner) of the road on which the vehicle 1 is running and determine the running locus of the present vehicle. The target determining section 16 also recognizes stationary objects provided along a side of the traffic lane, such as a cat's eye or a white stripe, so as to determine the lane on which the vehicle 1 is running, thereby distinguishing the preceding vehicle on the lane on which the vehicle 1 is running from vehicles in the next lane. In addition, if the vehicle 1 is stopped, the target determining section 16 distinguishes the preceding vehicle from the other vehicles by referring to the running locus of the present vehicle 1 computed before the stopping of the present vehicle 1.

The control state determining section 17 performs running control of the vehicle 1 based on (i) the signal from a switch among the switches 10 provided for the driver who inputs the driving operation, where the switches 10 include a advancing/stopping switch 25 for the driver who inputs the intention of the advancing or stopping operation, a control advancing switch 26 for inputting the intention of advancing the follow running control, and a canceling switch 27 for inputting the intention of canceling the follow running control, and (ii) data of the object input from the target determining section 16. The control state determining section 17 also informs the driver of the control state via the communicating section 12. The running control of the vehicle 1 is performed based on the transition between three states OFF, FOLLOW-UP, and HOLD STOP STATE. The state transition in the running control of the vehicle 1 by the control state determining section 17 will be explained below in detail.

The target inter-vehicle distance determining section 18 determines a target distance between the vehicle 1 controlled by the follow running control system and the preceding vehicle (i.e., the target inter-vehicle distance), based on the driver's operation input via a inter-vehicle distance setting switch 28 among the switches 10 (provided for the driver who inputs the driving operation). The target speed determining section 19 computes a target speed which is an optimum speed for the vehicle 1 based on the control state determined by the control state determining section 17 and the target inter-vehicle distance determined by the target inter-vehicle distance determining section 18. In order that the vehicle 1 runs at the target speed, the target speed determining section 19 controls the throttle control section 13 and the brake fluid pressure determining section 15.

Specifically, when the target speed is higher than the present speed of the vehicle 1, the target speed determining section 19 commands the throttle actuator 5 to increase the degree of opening of the throttle, which is output from the throttle control section 13, so as to increase the engine speed and accelerate vehicle 1. When the target speed is lower than the present speed of the vehicle 1, the target speed determining section 19 commands the brake actuator 6 to increase the target fluid pressure of the brake fluid, which is output from the brake fluid pressure determining section 15, so as to make the brake control section 14 operate the brake.

Figure 3:
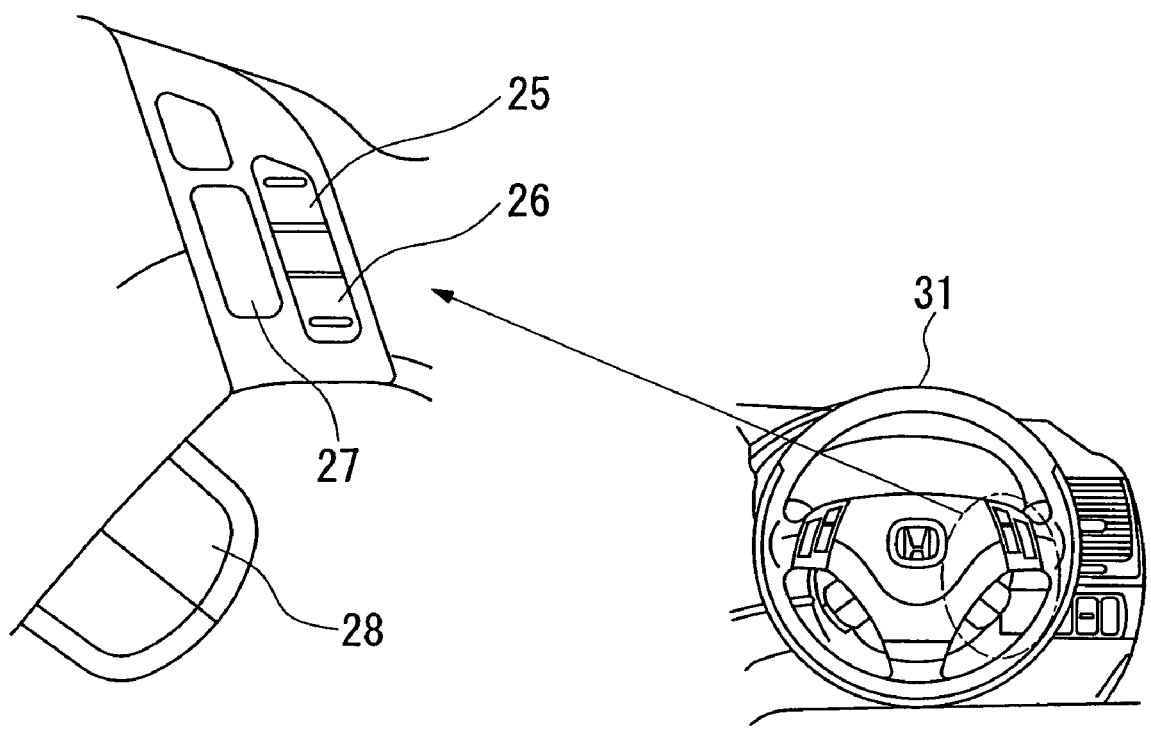
FIG. 3 shows an example of the layout for the advancing/stopping switch, the control starting switch, the canceling switch, and the inter-vehicle distance setting switch of the follow running control system in the embodiment.

FIG. 3 shows an example of the layout for the above-explained advancing/stopping switch 25, the control advancing switch 26, the canceling switch 27, and the inter-vehicle distance setting switch 28. Each switch is provided close to the steering wheel 31 for the driver's smooth operation. Here, operation switches of the cruise control provided in the vehicle 1 may also serve as the advancing/stopping switch 25, the control starting switch 26, the canceling switch 27, and the inter-vehicle distance setting switch 28.

Control State Transition

Hereinbelow, the state of transition of the running control by the control state determining section 17 will be explained by referring to the drawings.

Figure 4:
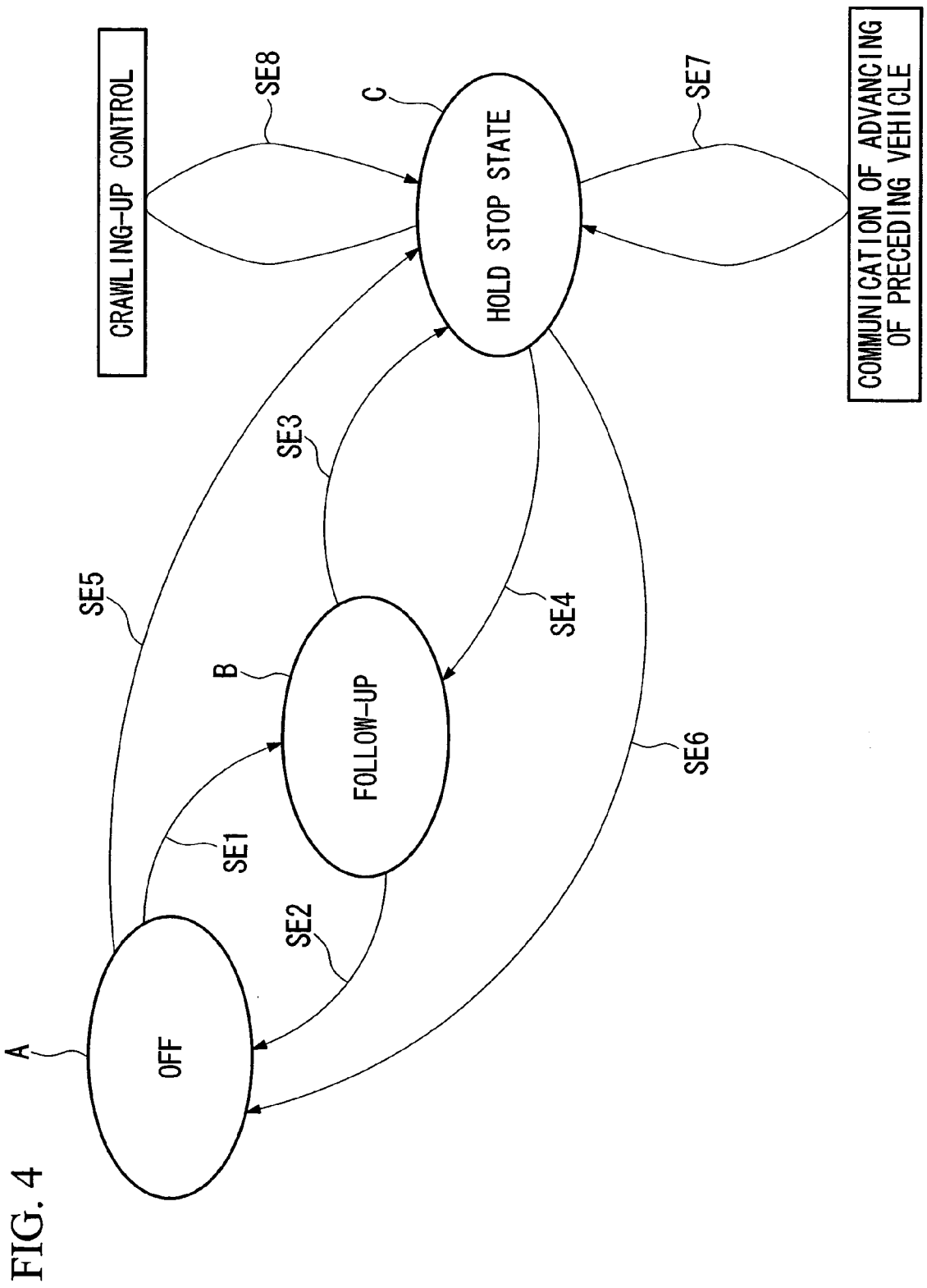
FIG. 4 is a diagram showing the state transition of the running control by the control state determining section of the follow running control system in the embodiment.

FIG. 4 is a diagram showing the state transition of the running control by the control state determining section 17. FIG. 4 shows three states A: OFF, B: FOLLOW-UP, and C: HOLD STOP STATE, as explained above. The first state OFF indicates a state when the running control by the follow running control system is not performed. The second state FOLLOW-UP indicates a state when the running control by the follow running control system is performed. The third state HOLD STOP STATE indicates a state in which after the preceding vehicle followed by the vehicle 1 is stopped, the vehicle 1 stops behind the preceding vehicle and holds the stopping state.

The control state determining section 17 changes the running control state as shown in FIG. 4, according to the input as explained below, which functions as a trigger.

When the present running control state is OFF (see reference symbol A in FIG. 4), if the preceding vehicle followed by the vehicle 1 is detected and the driver switches on the control starting switch 26, the control state determining section 17 changes the running control state from OFF to FOLLOW-UP (see reference symbols B and SE1 (which indicates a state transition) in FIG. 4).

When the present running control state is FOLLOW-UP, if the vehicle 1 loses the trail of the preceding vehicle, or the driver switches on the canceling switch 27 or depresses the brake pedal, the control state determining section 17 changes the running control state from FOLLOW-UP to OFF (see reference symbol SE2 (which also indicates a state transition)).

When the present running control state is FOLLOW-UP, if the preceding vehicle is stopped and the vehicle 1 stops behind the preceding vehicle at a predetermined position, the control state determining section 17 changes the running control state from FOLLOW-UP to HOLD STOP STATE (see reference symbols C and SE3 (which also indicates a state transition)).

When the present running control state is in the HOLD STOP STATE, if the driver indicates his or her intention to advance by switching on the advancing/stopping switch 25 or depressing the accelerator pedal, and if the preceding vehicle advances, the control state determining section 17 changes the running control state from HOLD STOP STATE to FOLLOW-UP (see reference symbol SE4 (which also indicates a state transition)). That is, pushing of the advancing/stopping switch 25 while in HOLD STOP STATE indicates the driver's intention to advance.

If the driver switches on the advancing/stopping switch 25 in a predetermined time after indicating his or her intention to advance, the control state determining section 17 cancels the intention to advance. In this process, pushing of the advancing/stopping switch 25 indicates the driver's intention to stop the vehicle. If the preceding vehicle is not advancing by a predetermined time after indicating the driver's intention to advance, the control state determining section 17 also cancels the intention to advance.

When the present running control state is OFF and the preceding vehicle followed by the vehicle 1 is stopped and the vehicle 1 is also stopped behind the preceding vehicle, if the driver switches on the control starting switch 26, the control state determining section 17 directly changes the running control state from OFF to HOLD STOP STATE (see reference symbol SE5 (which also indicates a state transition)).

When the present running control state is in the HOLD STOP STATE, if the driver switches on the canceling switch 27 or depresses the brake pedal, the control state determining section 17 directly changes the running control state from the HOLD STOP STATE to OFF (see reference symbol SE8 (which also indicates a state transition)).

When the present running control state is in the HOLD STOP STATE, if the driver switches on the canceling switch 27 or depresses the brake pedal, the control state determining section 17 directly changes the running control state from the HOLD STOP STATE to OFF (see reference symbol SE6 (which also indicates a state transition)).

When the present running control state is in the HOLD STOP STATE, if advancing of the preceding vehicle is detected, the control state determining section 17 informs the driver of the advancing of the preceding vehicle via the communicating section 12 (see reference symbol SE7 (which also indicates a state transition)).

When the present running control state is in the HOLD STOP STATE and the distance between the stopped vehicle 1 and the stopped preceding vehicle (i.e., a stationary inter-vehicle distance) is greater than a minimum target stop distance which is determined for prohibiting the vehicle 1 from approaching the preceding vehicle, if the driver switches on the advancing/stopping switch 25 or depresses the accelerator pedal, the control state determining section 17 performs "crawling-up control" while keeping the present HOLD STOP STATE (see reference symbol SE8 (which also indicates a state transition)).

The crawling-up control and the running control from HOLD STOP STATE in which the vehicle 1 is stopped will be explained below.

[Crawling-Up Control of Vehicle 1]

The crawling-up control of the vehicle 1 by the control state determining section 17 will be explained by referring to the drawings.

Figure 5:
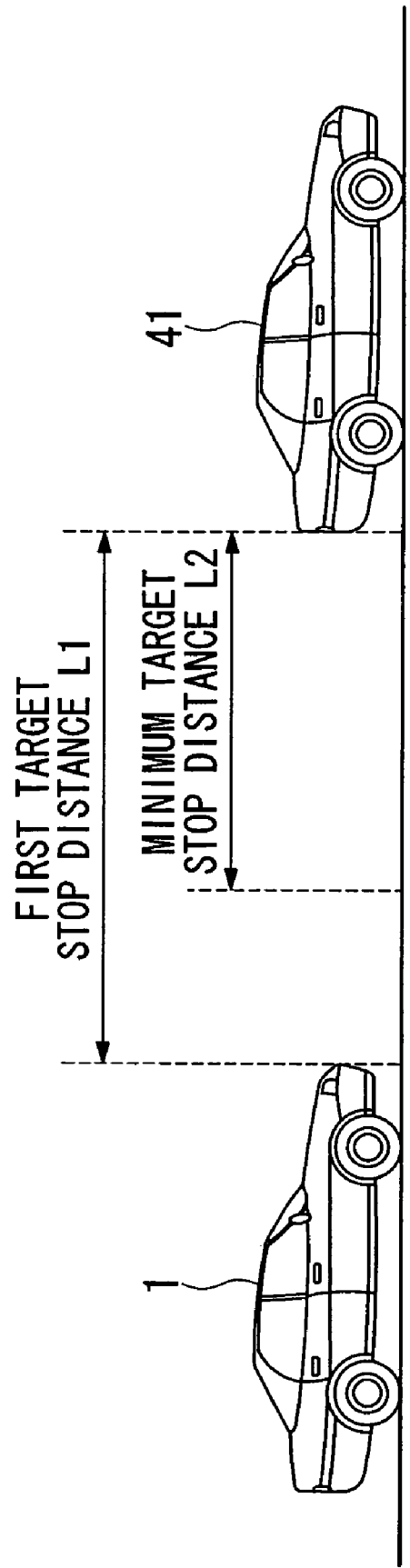
FIG. 5 is a diagram showing the stopping position of the vehicle in which the follow running control system in the embodiment is provided, with respect to the stopped preceding vehicle.

FIG. 5 is a diagram showing the stopping position of the vehicle 1 with respect to the stopped preceding vehicle.

As shown in FIG. 5, when the preceding vehicle 41 is stopped, the vehicle 1 stops with the first target stop distance L1 (e.g., L1=5 m), and after that, the control state determined by the control state determining section 17 is set to HOLD STOP STATE. With respect to the first target stop distance L1, the minimum target stop distance L2 (L2<L1, e.g., L2=4 m) is determined for prohibiting the vehicle 1 from further approaching the preceding vehicle 41.

In FIG. 5, when the distance between the stopped vehicle 1 and the stopped preceding vehicle 41 (i.e., the stationary inter-vehicle distance) is greater than the minimum target stop distance L2 and the control state determined by the control state determining section 17 is HOLD STOP STATE, if the advancing/stopping switch 25 is switched on, the control state determining section 17 makes the vehicle 1 advance by a predetermined distance L3 (e.g., L3=0.5 m). Accordingly, the distance between the vehicle 1 and the preceding vehicle 41 is slightly decreased.

The above control, performed by the control state determining section 17 when the stationary inter-vehicle distance is greater than the minimum target stop distance L2, for making the vehicle 1 advance by the predetermined distance L3 is called "crawling-up control" in the present embodiment. For example, the above first target stop distance L1 is longer than an average distance between stopped vehicles driven by ordinary drivers; thus, the driver of the vehicle 1 may experience discomfort due to a crowded state in traffic situations around the vehicle 1. In such a case, the crawling-up control for decreasing the stationary inter-vehicle distance to the minimum target stop distance L2 is effective.

After the stationary inter-vehicle distance reaches the minimum target stop distance L2, even when the advancing/stopping switch 25 is further pushed (i.e., switched) on, the running control state determined by the control state determining section 17 is maintained at the HOLD STOP STATE and the brake is not released. In addition, if the preceding vehicle 41 advances during the crawling-up control, the control state determining section 17 changes the running control state from HOLD STOP STATE to FOLLOW-UP without informing the driver via the communicating section 12 of the advancing of the preceding vehicle.

Running Control from HOLD STOP STATE in which the Vehicle 1 is Stopped

Next, the running control operation from HOLD STOP STATE in which the vehicle 1 is stopped will be explained by referring to the drawings, where the operation includes the above-explained crawling-up control.

Figure 6:
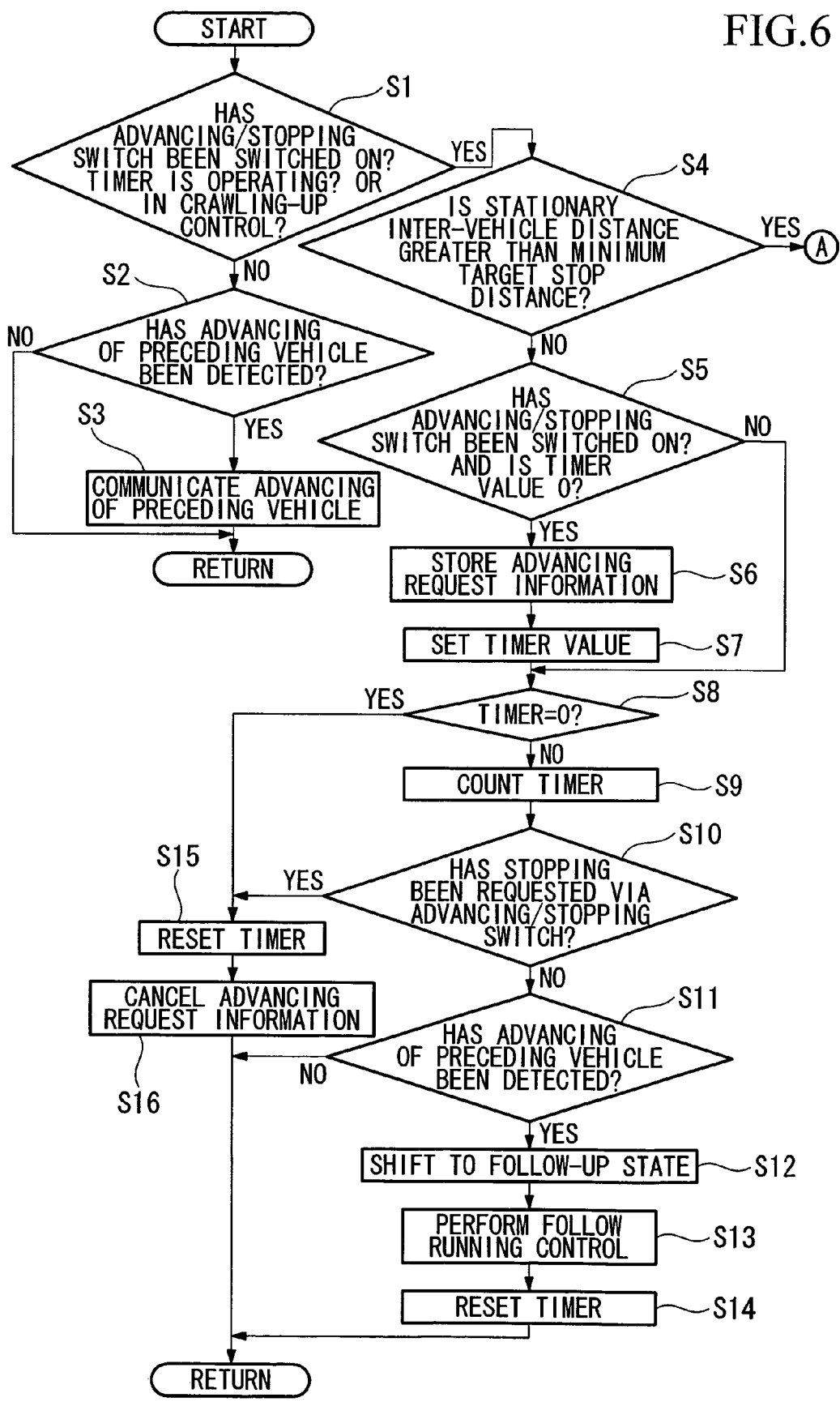
FIG. 6 is a flowchart of the running control operation from HOLD STOP STATE in which the vehicle is stopped, where the control operation is performed by the control state determining section of the follow running control system in the embodiment.
Figure 7:
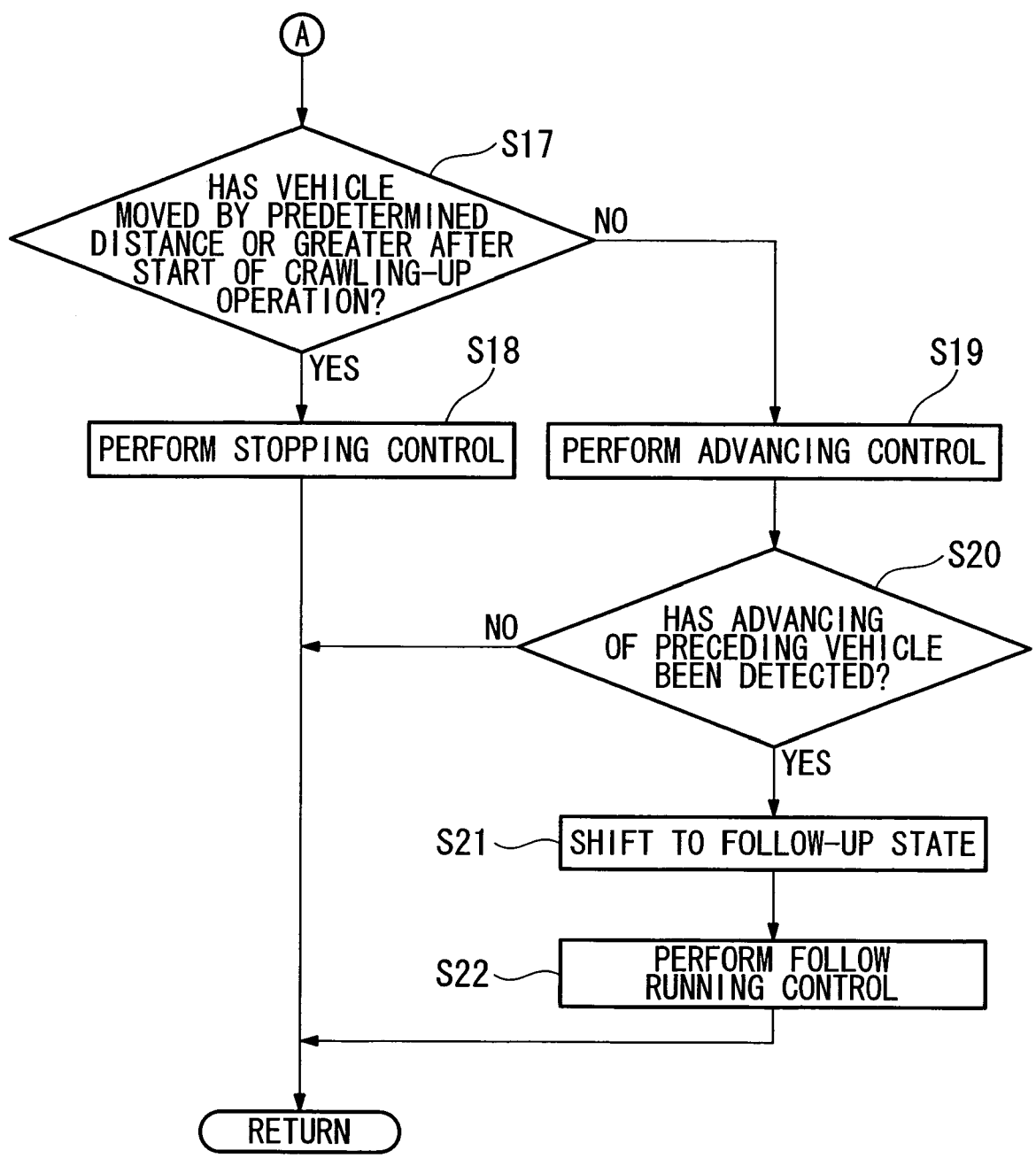
FIG. 7 is also a flowchart of the running control operation from HOLD STOP STATE in which the vehicle is stopped, where the control operation is performed by the control state determining section of the follow running control system in the embodiment.

FIGS. 6 and 7 show flowcharts of the running control operation from HOLD STOP STATE in which the vehicle 1 is stopped, where the control operation is performed by the control state determining section 17. While the vehicle 1 follows the preceding vehicle 41 and is stopped, the control state determining section 17 is activated and performs the operation shown in FIGS. 6 and 7 at regular intervals.

In FIG. 6, the control state determining section 17 is activated at regular intervals and determines whether the advancing/stopping switch 25 has been switched on, or a timer (explained below) is operating, or the vehicle 1 is controlled by the crawling-up control (in step S1).

If none of the above three conditions is confirmed, that is, the advancing/stopping switch 25 has not been switched on, the timer is not operating, and the vehicle 1 is not in the crawling-up control state (when determined NO in step S1), the control state determining section 17 determines whether advancing of the preceding vehicle 41 has been detected (in step S2).

If it is determined in step S2 that the advancing of the preceding vehicle 41 has not been detected (when determined NO in step S2), the control state determining section 17 terminates the control operation of this time. If it is determined in step S2 that the advancing of the preceding vehicle 41 has been detected (when determined YES in step S2), the control state determining section 17 informs the driver of the advancing of the preceding vehicle 41 via the communicating section 12 to the driver, by using the indicator 8 or the buzzer 9 (in step S3).

If any one of the three conditions is satisfied in step S1, that is, the advancing/stopping switch 25 has been switched on, or the timer is operating, or the vehicle 1 is in the crawling-up control state (when determined YES in step S1), the control state determining section 17 determines whether the distance between the stopped vehicle 1 and preceding vehicle 41 (i.e., the stationary inter-vehicle distance) is greater than the minimum target stop distance L2 (in step S4).

In step S4, if the stationary inter-vehicle distance is equal to or less than the minimum target stop distance L2 (when determined NO in step S4), the control state determining section 17 performs reserved advancing control in which it is first determined whether the advancing/stopping switch 25 has been switched on and the value of the timer is zero (in step S5).

In step S5, if the advancing/stopping switch 25 has been switched on and the value of the timer is zero (when determined YES in step S5), the control state determining section 17 stores advancing request information which is the driver's control operation requesting advancing of the vehicle 1 while both of the vehicle 1 and the preceding vehicle 41 are maintained at HOLD STOP STATE (in step S6).

After storing the advancing request information, the control state determining section 17 sets the timer value, for example, to 2 seconds (in step S7) and monitors whether the preceding vehicle 41 is advanced in 2 seconds counted by the timer.

More specifically, the control state determining section 17 first determines whether the timer value is zero (in step S8), and if the timer value is not zero (when determined NO in step S8), subtraction of the timer value is performed so as to perform counting of the timer (in step S9).

If the advancing/stopping switch 25 has been switched on but the timer value is not zero in step S5, or if the time value is zero but the advancing/stopping switch 25 has not been switched on (when determined NO in step S5), the control state determining section 17 determines whether the timer value is zero (in step S8). If the timer value is not zero (when determined NO in step S8), subtraction of the timer value is performed so as to perform counting of the timer (in step S9).

In the above process, the control state determining section 17 monitors whether the driver, who does not want to start the vehicle 1 and follow the preceding vehicle 41 even when the preceding vehicle 41 is advanced, has switched on the advancing/stopping switch 25, that is, input a stopping request (in step S10).

If the driver has not switched on the advancing/stopping switch 25 and not input the stopping request (when determined NO in step S10), the control state determining section 17 next determines whether advancing of the preceding vehicle 41 has been detected (in step S11).

If it is determined in step S11 that advancing of the preceding vehicle 41 has been detected (see YES in step S11), the control state determining section 17 changes the running control state explained in FIG. 4 to FOLLOW-UP (in step S12).

The control state determining section 17 makes the vehicle 1 advance and follow up the preceding vehicle 41 without informing the driver via the communicating section 12 of the advancing of the preceding vehicle 41, and starts the follow running control (in step S13).

The control state determining section 17 then resets the timer value, that is, sets the timer value to zero (in step S14), and terminates the control operation of the present turn. In the above case, the vehicle 1 starts running; thus, the running control operation from HOLD STOP STATE (in which the vehicle 1 is stopped) is terminated.

If it is determined in step S8 that the timer value is zero (when determined YES in step S8) or if it is determined in step S10 that the driver has switched on the advancing/stopping switch 25 and thus input a stopping request (when determined YES in step S10), the control state determining section 17 resets the timer value (i.e., sets the timer value to zero) (in step S15) and canceling the advancing request information stored in step S6 (in step S16). The control state determining section 17 then terminates the control operation of the present turn.

If it is determined in step S4 that the stationary inter-vehicle distance is greater than the minimum target stop distance L2 (when determined YES in step S4), the control operation shifts to step S17 in FIG. 7. The control state determining section 17 starts crawling-up operation as the crawling-up control and then determines whether the vehicle 1 has moved by the predetermined distance L3 or more (in step S17).

If the crawling-up operation has been performed and the vehicle 1 has moved by the predetermined distance L3 or more (when determined YES in step S17), the control state determining section 17 performs stopping control in which the brake fluid pressure determining section 15 and the brake control section 14 are controlled and the brake actuator 6 is activated, so as to stop the vehicle 1 (in step S18).

If the crawling-up operation has been performed but the vehicle 1 is still stopped or has not moved by the predetermined distance L3 or more (NO in step S17), the control state determining section 17 performs advance control in which the throttle control section 13 is controlled, so as to activate the throttle actuator 5 and advance the vehicle 1 (in step S19).

During the crawling-up control, the control state determining section 17 confirms whether advancing of the preceding vehicle 41 has been detected (in step S20). If advancing of the preceding vehicle 41 has not been detected (when determined NO in step S20), the control state determining section 17 terminates the control operation of the present turn.

If it is determined in step S20 that the advancing of the preceding vehicle 41 has been detected (when determined YES in step S20), the control state determining section 17 shifts the running control state to FOLLOW-UP (in step S21).

The control state determining section 17 then starts the follow running control by making the vehicle 1 follow up the preceding vehicle 41 and starting running of the vehicle 1, without informing the driver of the advancing of the preceding vehicle 41 via the communicating section 12 (in step S22) and terminates the control operation of the present turn. Also in this case, running of the vehicle 1 is started, and thus the running control operation from HOLD STOP STATE (in which the vehicle 1 is stopped) is terminated.

In the above running control, even when the running control state is HOLD STOP STATE, if the distance between the stopped vehicle 1 and the stopped preceding vehicle 41 (i.e., the stationary inter-vehicle distance) is greater than the minimum target stop distance L2 determined for prohibiting the vehicle 1 from approaching the preceding vehicle 41 and the driver switches on the advancing/stopping switch 25 or depresses the accelerator pedal, the control state determining section 17 performs the crawling-up control while keeping the HOLD STOP STATE. However, when the driver depresses the accelerator pedal so as to advance the vehicle 1, even if the stationary inter-vehicle distance is equal to or less than the minimum target stop distance L2, the driver's intention is given priority and the brake is released, so that running of the vehicle 1 is handled by the driver's operation.

In the above explanations for steps S1 to S22, in particular, in steps S1, S5, and S10, the driver's request to advance or stop the vehicle 1 is confirmed by referring to the on/off state of the advancing/stopping switch 25; however, the driver's request for advancing of the vehicle 1 may be confirmed by referring to the driver's operation of the accelerator pedal.

In the present embodiment, the operation of step S6 performed by the control state determining section 17 corresponds to the function of the advancing request storing device of the present invention.

As explained above, the follow running control system of the present embodiment has the radar apparatus 11 which can detect objects in the advance direction of the vehicle 1, determines the preceding vehicle 41 to be followed by the vehicle 1 among the detected objects, and performs follow running control with respect to the determined preceding vehicle 41. When both of the vehicle 1 and the preceding vehicle 41 are controlled in the stopping control, if driver's driving operation for requesting advancing of the vehicle 1 via the advancing/stopping switch 25 or the accelerator pedal is detected, the control state determining section 17 stores the driver's driving operation as the advancing request information. On the other hand, when the preceding vehicle 41 advances, if the advancing request information is stored, since it can be judged that the driver has an intention of advancing of the vehicle 1, the control state determining section 17 shifts the running control state from HOLD STOP STATE to FOLLOW-UP, thereby starting follow running control.

Therefore, by storing the driver's operation of requesting advancing of the vehicle 1 as the advancing request information when both of the vehicle 1 and the preceding vehicle 41 are controlled in the stopping control, it can be judged that the driver has an intention of advancing the vehicle 1 based on the advancing request information when the preceding vehicle 41 advances. Therefore, if the advancing request information has been already stored when the preceding vehicle 41 advances, the control state determining section 17 directly changes the running control state from HOLD STOP STATE to FOLLOW-UP, thereby starting follow running control. Thus, at the same time the preceding vehicle 41 advances, the vehicle 1 can be smoothly advanced by making the vehicle 1 follow the preceding vehicle 41.

Therefore, a difference in driving sensation between running of the vehicle 1 by the driver's natural operation and follow running by the follow running control system is reduced, and it is possible to realize a follow running control system by which the driver does not experience discomfort.

Even when the advancing request information has been stored and the driver's intention of advancing the vehicle 1 is confirmed, if the preceding vehicle 41 is not advancing by a predetermined time after storing the advancing request information, the control state determining section 17 cancels the confirmation of the driver's intention by canceling the advancing request information, and waits for the next input of the control operation for requesting advance of the vehicle 1. Thus, the vehicle 1 can be smoothly advanced such that the vehicle 1 follows the preceding vehicle 41 advancing, only when the driver's intention of advancing the vehicle 1 is surely confirmed by reconfirming whether or not the driver has an intention of advancing the vehicle 1. Therefore, a benefit can be obtained that the vehicle 1 can run appropriately following the driver's instruction and traffic situations around the vehicle 1.

In addition, if the preceding vehicle 41 advances when the driver's intention of advancing the vehicle 1 is confirmed, communication to the driver for informing the advance of the vehicle 41 can be canceled. Thus, when the driver has already indicated his or her intention to advance the vehicle 1 by inputting the control operation for requesting the advance of the vehicle 1, the vehicle 1 can smoothly advance and follow up the preceding vehicle 41 at the same time as the preceding vehicle 41 advances, without informing the driver of the advancing of the preceding vehicle 41 which is thought to be already recognized by the driver.

While preferred embodiments of the invention have been described and illustrated above, it should be understood that they are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A follow running control system comprising:
   an object detecting device, provided in a present vehicle, for detecting objects in an advance direction of the present vehicle;
   a preceding vehicle determining device for determining a preceding vehicle to be followed by the present vehicle from among the detected objects;
   a target inter-vehicle distance determining device for determining a target inter-vehicle distance between the present vehicle and the preceding vehicle;
   a target speed determining device for determining a target speed of the present vehicle based on a signal from the object detecting device and the target inter-vehicle distance;
   a follow running control device for controlling follow running of the present vehicle with respect to the preceding vehicle based on the determined target speed;
   a driving operation detecting device for detecting a driving operation performed by a driver of the present vehicle;
   a stopping state determining device for determining whether or not both of the present vehicle and the preceding vehicle are maintained in the stopped state;
   an advancing request storing device for storing a control operation input by the driver for requesting the advance of the present vehicle as an advancing request information, when both of the present vehicle and the preceding vehicle are maintained in the stopped state;
   a preceding vehicle advancing detecting device for detecting advancing of the preceding vehicle based on a signal from the object detecting device; and
   a running control device for performing running control of the present vehicle based on data of the preceding vehicle and a signal from the driving operation detecting device, wherein (1) if the control operation is input by the driver for requesting the advance of the present vehicle while both of the present vehicle and the preceding vehicle are in the stopped state, a control state of the present vehicle with respect to the follow running control device is maintained at a hold stop state, and (2) if advancing of the preceding vehicle is detected by the preceding vehicle advancing detecting device while the advancing request information is stored by the advancing request storing device, the running control device changes the control state of the present vehicle with respect to the follow running control device and starts follow running control.

2. The running control system according to claim 1, wherein if the advance of the preceding vehicle is not detected by a predetermined time after storing the advancing request information by the advancing request storing device, the running control device cancels the advancing request information.

3. The running control system according to claim 2, further comprising a communicating device for communicating advancing of the preceding vehicle to the driver based on a signal from the preceding vehicle advancing detecting device, wherein if advancing of the preceding vehicle is detected while the advancing request information is stored by the advancing request storing device, the communicating device does not communicate advancing of the preceding vehicle to the driver.

4. The running control system according to claim 1, further comprising a communicating device for communicating advancing of the preceding vehicle to the driver based on a signal from the preceding vehicle advancing detecting device, wherein if advancing of the preceding vehicle is detected while the advancing request information is stored by the advancing request storing device, the communicating device does not communicate advancing of the preceding vehicle to the driver.

5. The running control system according to claim 1, wherein the driving operation detecting device is an advancing switch operated by the driver, and when the advancing switch is operated by the driver, if both of the present vehicle and the preceding vehicle are maintained in the stopped state, the advancing request storing device stores the advancing request information.

6. The running control system according to claim 5, wherein if the driver operated the advancing switch again within a predetermined time after storing the advancing request information by the advancing request storing device, the running control device cancels the advancing request information.

* * * * *